C. E. JEFFERS.
WIND SHIELD JOINT.
APPLICATION FILED JAN. 11, 1918.
1,291,533.
Patented Jan. 14, 1919.
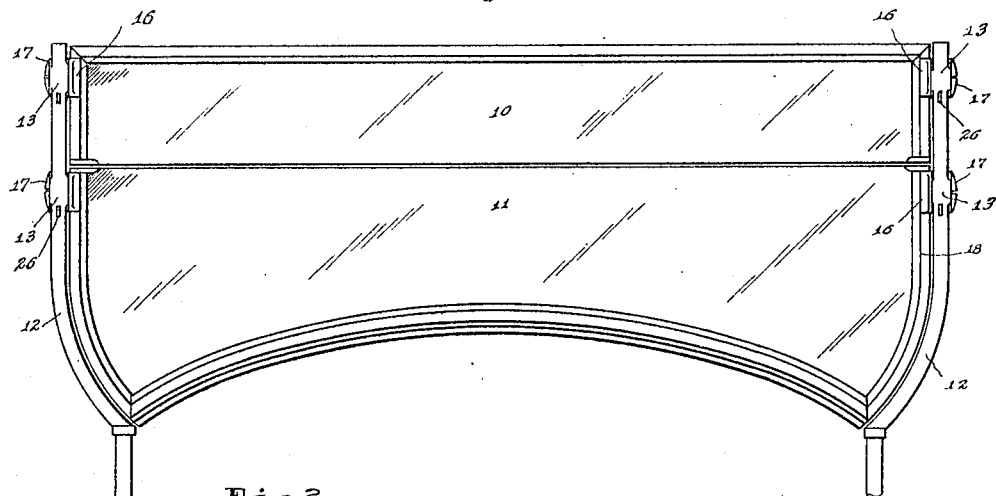
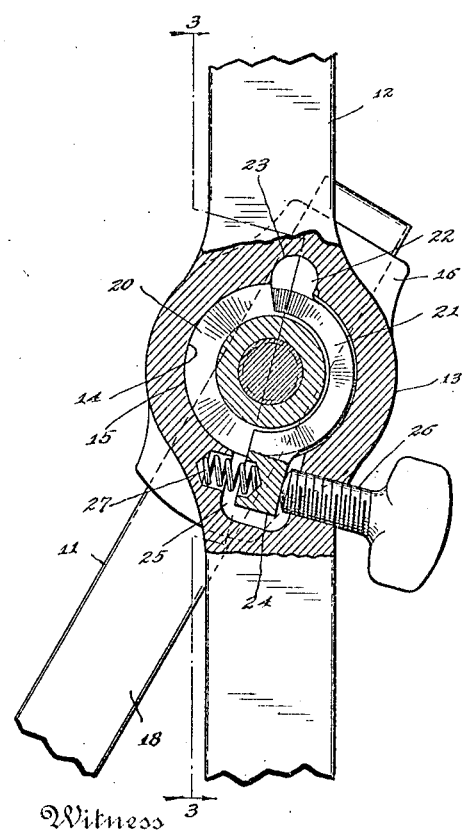
Witness
Frank A. Fable
Inventor
Clarence E. Jeffers,
By
Hood & Schley,
Attorneys

UNITED STATES PATENT OFFICE.

CLARENCE E. JEFFERS, OF INDIANAPOLIS, INDIANA, ASSIGNOR TO HOWARD MARMON, OF INDIANAPOLIS, INDIANA.

WIND-SHIELD JOINT.

1,291,533. Specification of Letters Patent. Patented Jan. 14, 1919.

Application filed January 11, 1918. Serial No. 211,428.

*To all whom it may concern:*

Be it known that I, CLARENCE E. JEFFERS, a citizen of the United States, residing at Indianapolis, in the county of Marion and State of Indiana, have invented a new and useful Wind-Shield Joint, of which the following is a specification.

It is the object of my invention to provide a pivot joint for wind-shields, whereby the wind-shield may readily be turned to any desired angle, and there held firmly; and to do this by a structure which is simple, compact, inexpensive, and not easily disabled.

The accompanying drawing illustrates my invention. Figure 1 is a front elevation of a wind-shield and its support, including four joints embodying my invention; Fig. 2 is a side elevation of a fragment of a wind-shield and its support, with the wind-shield joint in section substantially on the line 2—2 of Fig. 3; and Fig. 3 is a section on the line 3—3 of Fig. 2.

The wind-shield ordinarily comprises two sections 10 and 11, which are supported one above the other in suitable side uprights 12. Each wind-shield section 10 and 11 has a pivotal mounting in each upright, and each of these pivotal mountings is a joint embodying my invention. At each of these joints the upright 12 has an enlargement 13, through which a cylindrical hole 14 extends along the axis of rotation of the associated wind-shield section. Fitting rotatably in the hole 14 is the shank 15 which constitutes the rotatable element of the joint. The hole 14 is a complete bearing for the shank 15. This shank 15 has a head 16 on the inner face of the support 12, and is held in place in the hole 14 between such head 16 and the head of a cap screw 17 screwed into the outer end of the shank 15, the head 16 and the head of the cap screw 17 engaging opposite faces of the support 12 on suitably machined surfaces. The head 16 is attached to the wind-shield section in any suitable manner, as by having a groove which receives and has suitably fastened within it the side member 18 of the frame of said wind-shield section.

The shank 15 is provided on its outer cylindrical surface with a doubly tapered groove, which is narrower at the bottom than at the top and both side walls of which taper. Extending into this doubly tapered groove is a curved wedge 21, forming substantially a half ring, the side walls of this curved wedge 21 being tapered to correspond to the side walls of the groove 20. The wedge 21, however, does not extend entirely to the bottom of the groove 20, so that there will be no interference with the binding action between the side walls and the wedge in the groove. At one end, the wedge 21 is provided with a pivot boss 22, which fits in a pivot hole 23 formed in the enlargement 13 at the side of the hole 14. At the opposite end, the wedge 21 has a projection 24 which extends into a larger hole 25 formed in the enlargement 13 approximately diametrically opposite to the pivot hole 23. The projection 24 has considerable play within the hole 25, as is clear from Fig. 2. A thumb screw 26 is mounted in the upright 12 and projects into the hole 25 into engagement with the projection 24, so that by tightening up this thumb screw the wedge 21 is swung around its pivot boss 22 and forced into the groove 20. If desired, a spring 27, mounted in suitable recesses in the projection 24 and the side of the hole 25, may be provided to act on the projection 24 oppositely from the screw 26, so as to insure that upon the unscrewing of the screw 26 the projection 24 will follow such screw to lift the wedge 21 partly out of the groove 20.

In operation, when the screw 26 is loosened the shank 15 may be turned freely within the hole 14, to adjust the associated wind-shield section to the desired position. When the proper adjustment of the wind-shield has been obtained, the screw 26 is tightened, to force the wedge 21 into the groove 20; and this also forces the shank 15 to the opposite side of the hole 14 from that along which the wedge 21 lies. In consequence, the shank 15 is firmly clamped in this position, and the wind-shield section is firmly held in the adjusted position. To do this it is necessary to tighten the screw 26 only slightly, because of the efficient binding action due to the wedge formation.

I claim as my invention:

1. A wind-shield joint, comprising a supporting member provided with a pivot hole, a shank rotatably mounted within said hole, said shank being provided on its outer surface with a tapered groove having both sides tapered, an arc-shaped wedge projecting into said groove and having side walls corresponding to the side walls of the groove, and means for adjustably forcing said curved wedge into said groove.

2. A wind-shield joint, comprising a supporting member provided with a pivot hole, a shank rotatably mounted within said hole, said shank being provided on its outer surface with a tapered groove, an arc-shaped wedge projecting into said groove and having side walls corresponding to the side walls of the groove, and means for adjustably forcing said curved wedge into said groove.

3. A wind-shield joint, comprising a supporting member provided with a pivot hole, a shank rotatably mounted within said hole, said shank being provided on its outer surface with a tapered groove having both sides tapered, an arc-shaped wedge projecting into said groove and having side walls corresponding to the side walls of the groove, said arc-shaped wedge having a pivot mounting at one end, and a screw for adjusting the position of the other end of said wedge to vary the extent to which said wedge is forced into said groove.

4. A wind-shield joint, comprising a supporting member provided with a pivot hole, a shank rotatably mounted within said hole, said shank being provided on its outer surface with a tapered groove, an arc-shaped wedge projecting into said groove and having side walls corresponding to the side walls of the groove, said arc-shaped wedge having a pivot mounting at one end, and a screw for adjusting the position of the other end of said wedge to vary the extent to which said wedge is forced into said groove.

5. A wind-shield joint, comprising a supporting member provided with a pivot hole, a shank rotatably mounted within said hole, said shank being provided on its outer surface with a tapered groove, an arc-shaped wedge projecting into said groove and having side walls corresponding to the side walls of the groove, means for adjustably forcing said curved wedge into said groove, and a spring tending to force said wedge out of said groove.

6. A wind-shield joint, comprising a supporting member provided with a pivot hole, a shank rotatably mounted within said hole, said shank being provided on its outer surface with a tapered groove, an arc-shaped wedge projecting into said groove and having side walls corresponding to the side walls of the groove, said arc-shaped wedge having a pivot mounting at one end, a screw for adjusting the position of the other end of said wedge to vary the extent to which said wedge is forced into said groove, and a spring tending to force said wedge out of said groove.

7. A wind-shield joint, comprising a supporting member provided with a pivot hole, a shank rotatably mounted within said hole, said shank being provided on its outer surface with a tapered groove, the wall of said pivot hole being provided with a recess, an arc-shaped wedge located within said recess and projecting into said groove and having side walls corresponding to the side walls of the groove, and means for adjustably forcing said curved wedge into said groove.

8. A wind-shield joint, comprising a supporting member provided with a pivot hole, a shank rotatably mounted within said hole, said shank being provided on its outer surface with a tapered groove, the wall of said pivot hole being provided with a recess, an arc-shaped wedge located within said recess and projecting into said groove and having side walls corresponding to the side walls of the groove, said arc-shaped wedge having a pivot mounting at one end, and a screw for adjusting the position of the other end of said wedge to vary the extent to which said wedge is forced into said groove.

In witness whereof I have hereunto set my hand at Indianapolis, Indiana, this 8th day of January A. D. one thousand nine hundred and eighteen.

CLARENCE E. JEFFERS.

Copies of this patent may be obtained for five cents each, by addressing the "Commissioner of Patents, Washington, D. C."